United States Patent [19]

Pokrinchak

[11] Patent Number: 4,510,708
[45] Date of Patent: Apr. 16, 1985

[54] VIEWER FOR X-RAY AND LIKE FILMS

[75] Inventor: Jordan J. Pokrinchak, Shelton, Conn.

[73] Assignee: Bar-Ray Products, Inc., Brooklyn, N.Y.

[21] Appl. No.: 635,170

[22] Filed: Jul. 27, 1984

[51] Int. Cl.³ .................................................. G02B 27/02
[52] U.S. Cl. ...................................... 40/361; 40/471; 40/387; 40/152.2
[58] Field of Search ................ 40/361, 362, 363, 364, 40/365, 366, 367, 152.2, 386, 387, 564

[56] References Cited

U.S. PATENT DOCUMENTS

| | | | |
|---|---|---|---|
| 2,436,162 | 2/1948 | Cadenas | 40/361 |
| 2,516,270 | 7/1950 | Swain | 40/361 |
| 2,534,637 | 12/1950 | Sussin | 40/361 |
| 2,754,605 | 7/1956 | Berkeley | 40/471 |
| 2,800,733 | 7/1957 | Chevillon | 40/471 |
| 4,164,822 | 8/1979 | Batton | 40/361 |
| 4,267,489 | 5/1981 | Morohashi | 40/361 |

Primary Examiner—Gene Mancene
Assistant Examiner—Wenceslao J. Contreras
Attorney, Agent, or Firm—Mark T. Basseches; Paula T. Basseches

[57] ABSTRACT

A viewing device for X-ray films or the like automatically masks the areas of the viewing screen not in registry with the film to be viewed responsive to the insertion of a film. The device includes a dimension sensing mechanism which aligns a selected mask with a positioned film automatically in accordance with the sensed dimension.

14 Claims, 13 Drawing Figures

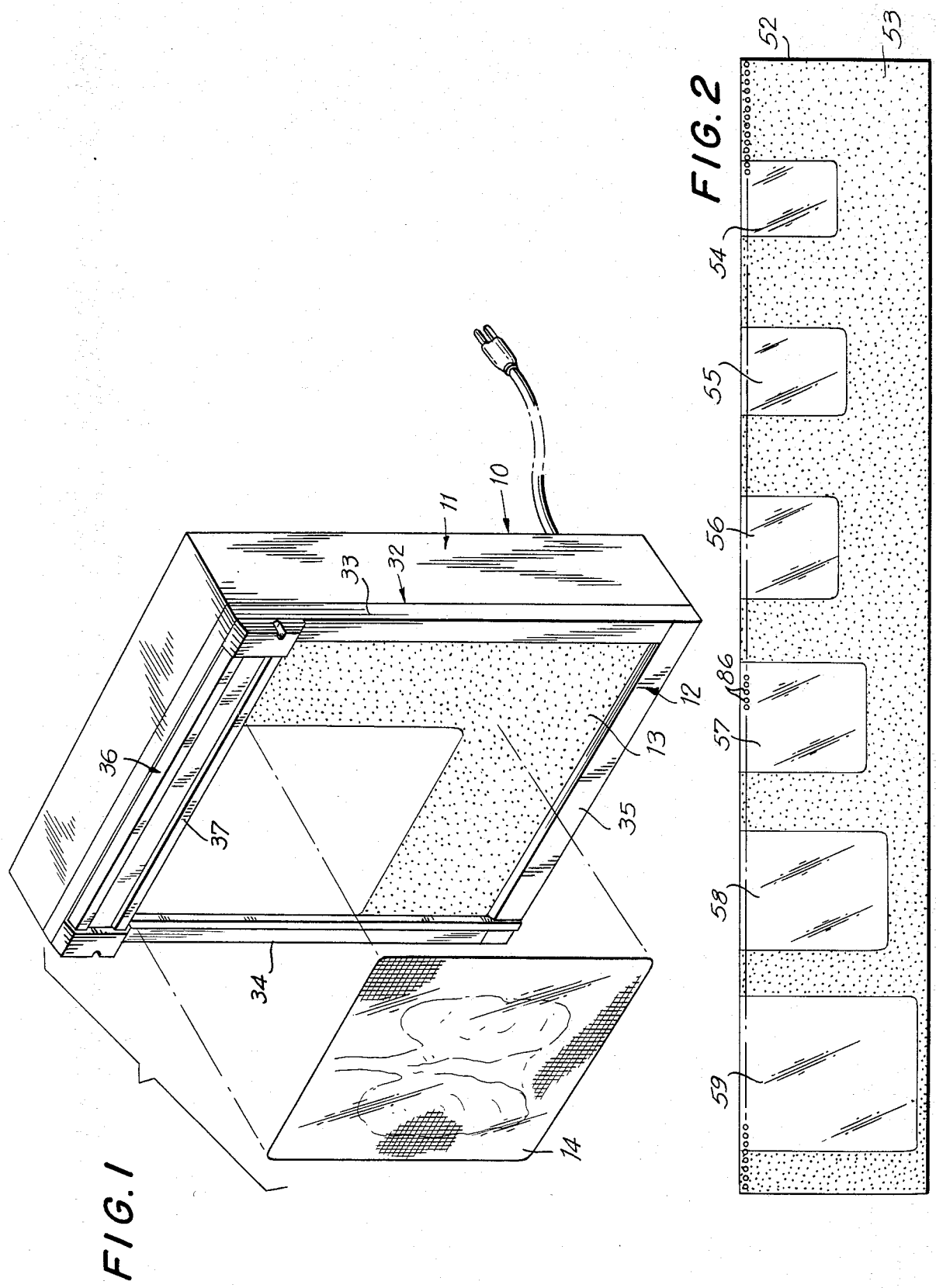

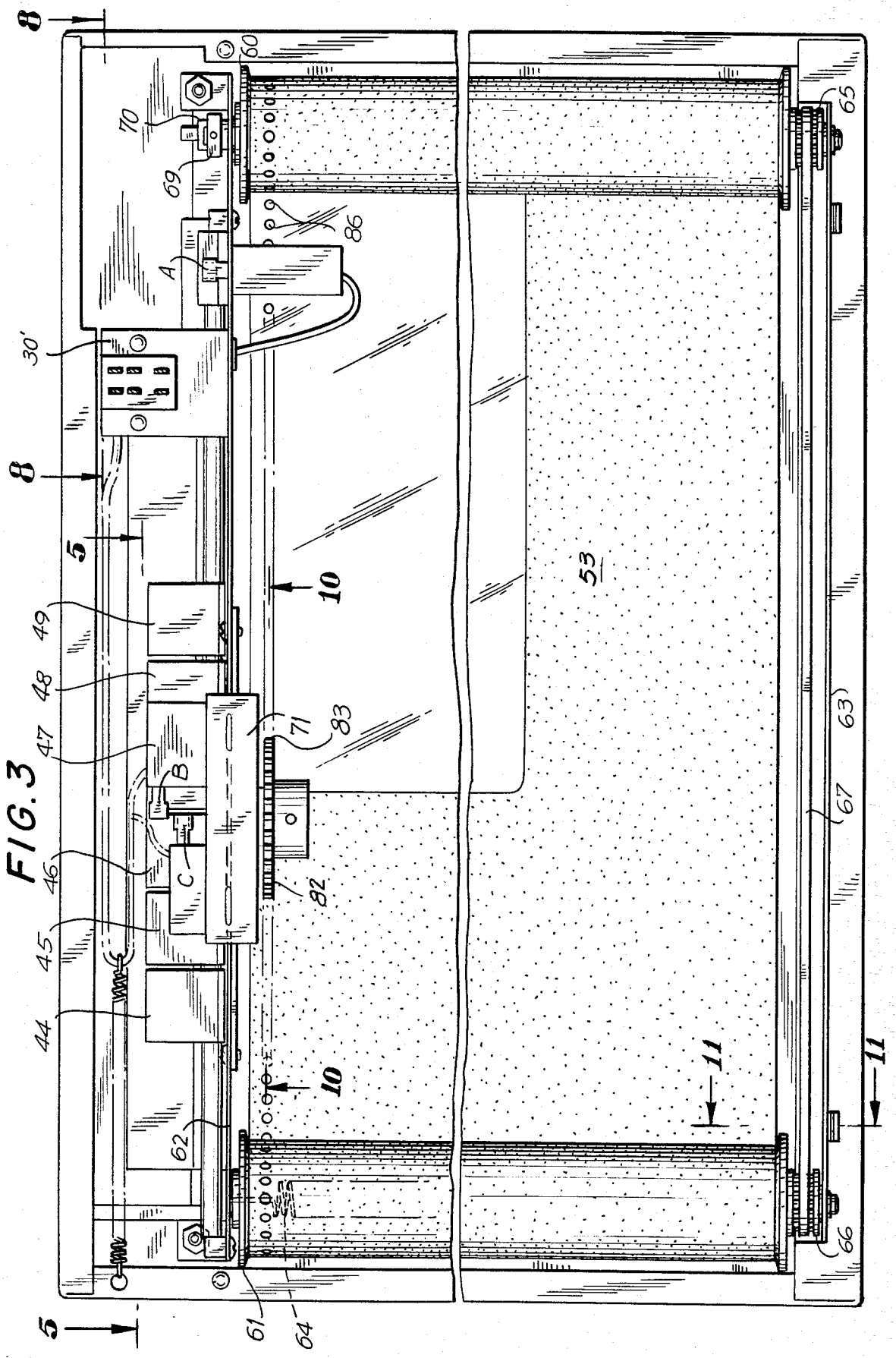

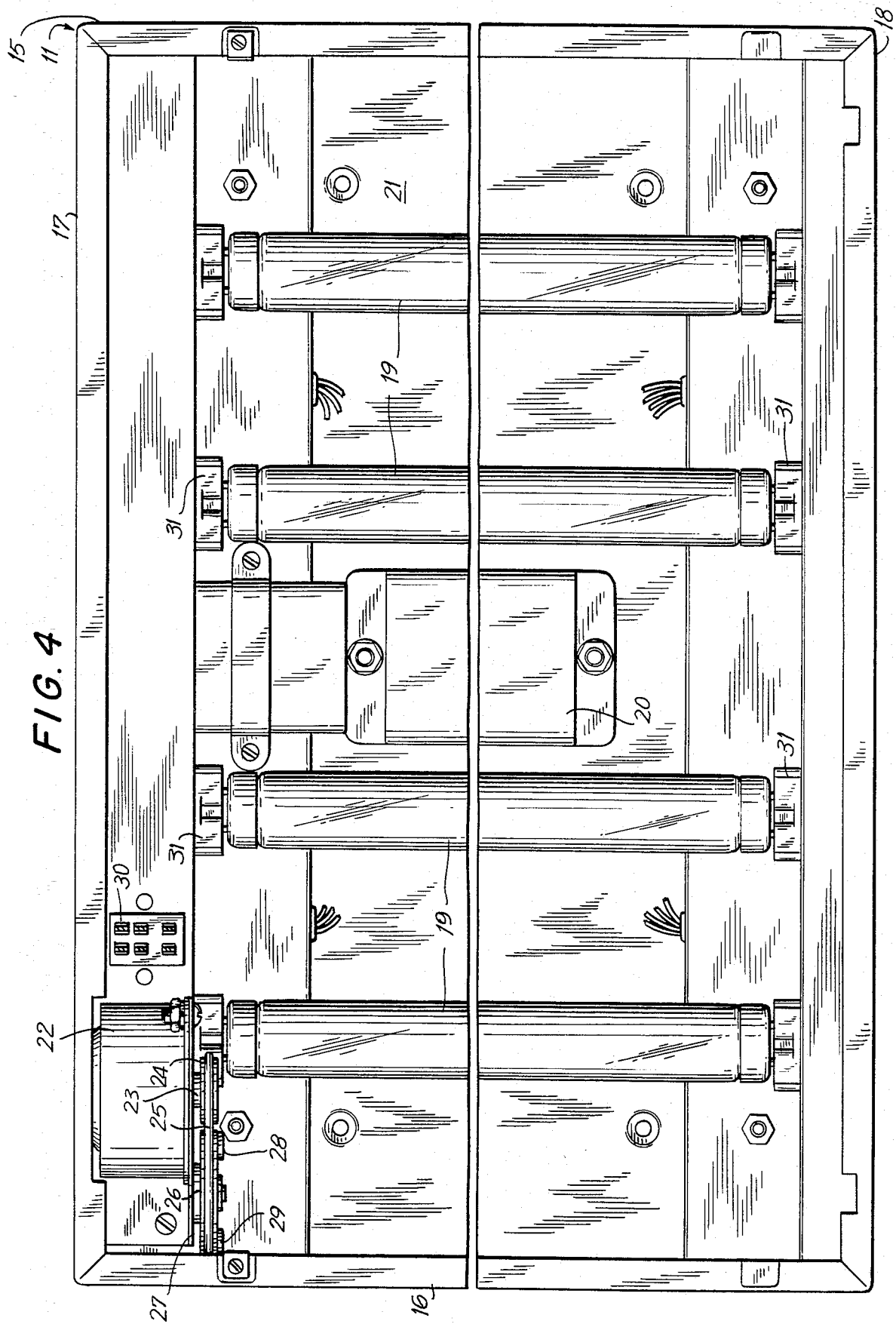

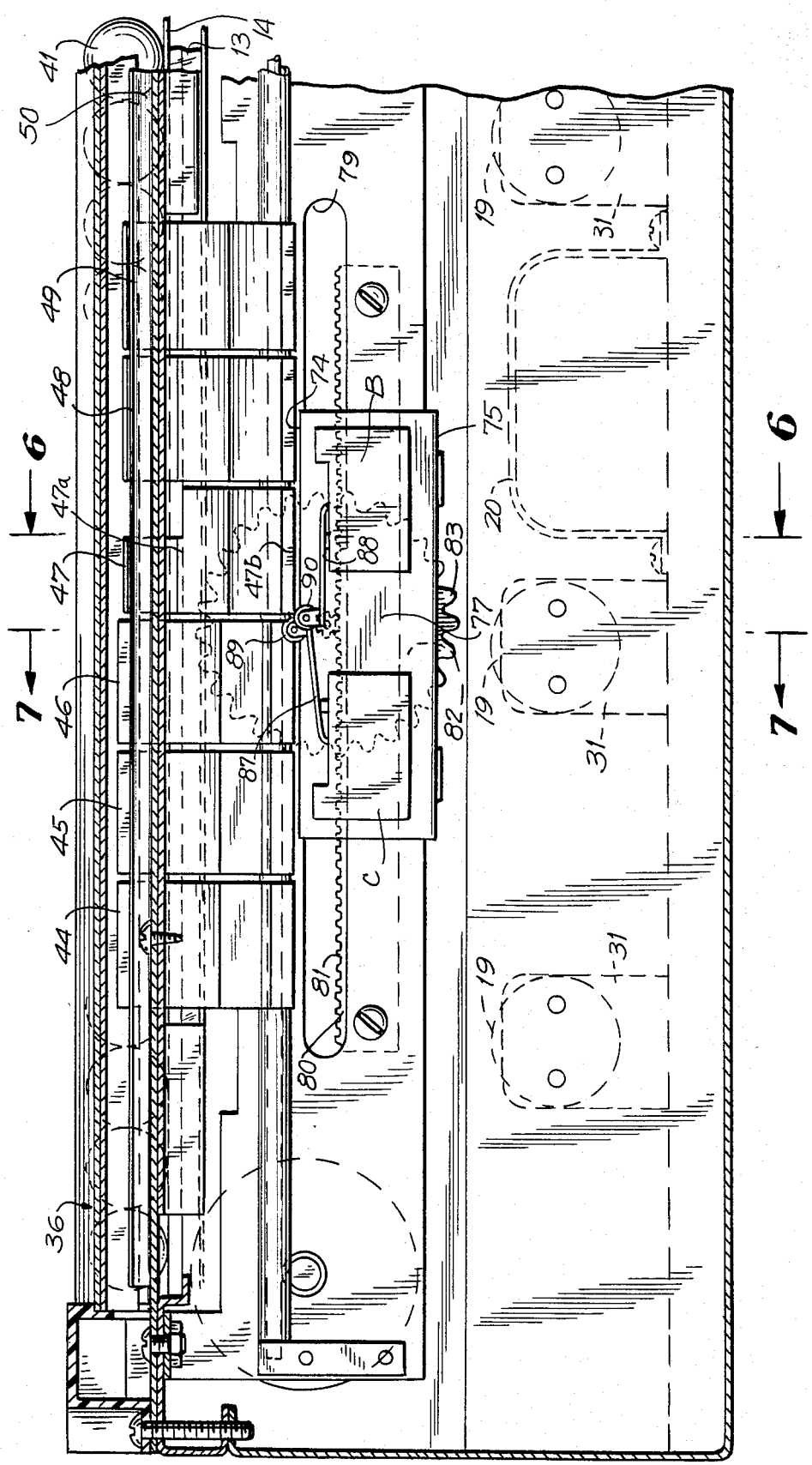

VIEWER FOR X-RAY AND LIKE FILMS

BACKGROUND OF THE INVENTION

1. Field of the Invention

The present invention relates to a viewing device for X-ray and like films, and more particularly to an improved viewing device of the type described.

2. The Prior Art

X-ray films are conventionally inspected by a physician or radiologist by disposing the same against a diffuser plate behind which is located a lighting source. X-ray films are supplied in a plurality of standard sizes. To accommodate the range of X-ray film sizes conventional devices include a diffuser plate substantially larger than the largest films likely to be viewed. When an X-ray plate mounted on such viewing device is inspected, a substantial glare is encountered as a result of the light passing through such portions of the diffuser out of registry with the X-ray film. A result of the glare condition noted involves significant eye strain on the part of the viewer required to inspect such plates over protracted periods. Moreover, a person reading an X-ray and exposed to the high light concentrations in areas directly surrounding the film will be less able to perceive critical but minor shadings and nuances in the film by reason of the contraction of the iris of the eye resulting from the high light concentrations passing the diffuser plate in areas surrounding the film.

While it is of course feasible for a viewer to overlay masking strips on the diffuser plate and thus block unwanted and contrast reducing light passing through the diffuser, as a practical matter readers of X-rays rarely resort to such practice.

Attempts have been made in the past to provide X-ray film reviewing devices which shield the eyes of the viewer from light emanating from the light source other than the light passing through the film.

In U.S. Pat. No. 1,988,654, Haag, there is disclosed a light box which incorporates two manually movable curtains for masking all of the light transmitting surfaces of a diffuser up to the edges of the film.

U.S. Pat. No. 2,436,162, Cadenas, discloses an X-ray viewer having a masking arrangement incorporating a plurality of hingedly connected opaque masks which may be manually pivoted relative to each other to expose all or only selected parts of an X-ray film.

U.S. Pat. No. 4,004,360, Hammond, is directed to a self-masking viewing device which purports automatically to obscure areas of the viewing screen not occupied by the X-ray film.

In accordance with such device, the screen is provided with a multiplicity of holes, which holes may be selectively blocked by shutters or opened for the passage of light. The interior of the device is connected to a vacuum source which functions to hold the film against the front surface of the device.

The vacuum functions, in addition, to close the shutters connected with those of the holes not covered by the film thereby passage of light through such holes is prevented. Air cannot pass through those of the holes in registry with the film and, thus, the shutters associated with the film covered holes remain open for the passage of light.

The device described is unsuitable for critical X-ray film inspection since the presence of holes and shutters in the viewing screen in the areas in registry with the film impose a pattern behind the film which interferes with the accurate reading of the film.

U.S. Pat. No. 4,373,280, Armfield, discloses an X-ray viewer having a cross bar for supporting films at a central portion of the screen. A series of shades is provided which may be manually activated to obscure selected parts of the illuminated surface not occupied by the film.

From the foregoing description of the most relevant prior art known to applicant it will be perceived that there has not heretofore been available an apparatus capable of use with X-ray films of a variety of sizes which automatically masks the areas not occupied by the film and which does not interpose between the light source and the film inspected a background or pattern which interferes with a critical examination of the film.

SUMMARY OF THE INVENTION

The present invention may be summarized as directed to improvements in X-ray or like film viewing devices characterized in that an appropriate sized mask is automatically aligned with a film responsive to insertion of the film into the viewing device, whereby all portions of the illuminated diffuser or light transmitting mechanism which are not in registry with the film are obscured.

Still more particularly, the present invention is directed to an X-ray viewing device including an essentially conventional housing, light fixture, and diffuser plate, the device including means for sensing, responsive to insertion of a film, a dimension of such film and shifting a masking mechanism into registry with the areas of the diffuser plate not occupied by the film responsive to the sensed dimension.

The invention is directed still more particularly to a viewing device of the type described wherein insertion of an X-ray film functions sequentially to mask the areas of the diffuser plate not occupied by the film and thereafter to energize the lighting fixture which illuminates the film automatically responsive to the insertion of the film.

In accordance with the invention, the apparatus includes a series of masks disposed in longitudinally displaced relation on an elongate scroll movably mounted within the light housing, the masks being sized to correspond with stock sizes of X-ray films.

The apparatus includes sensing means responsive to a width dimension of an inserted film, which sensing means functions to energize a motor for shifting the scroll in such manner as to align an appropriate masking portion of the scroll in registry with the borders of the film, whereby light is prevented from passing through the diffuser plate except at those portions of the plate in registry with the film.

In accordance with the invention, the widthwise sensing function is performed by a series of levers or fingers positioned to engage an edge of a film inserted into a film holder, the widthwise gauging function being effected by a switching mechanism which senses which of the fingers or levers have been depressed by the inserted film, the scroll being shifted responsively thereto.

In a specific embodiment, the scroll is mounted on a spaced pair of feed rolls, the rolls being disposed at opposite sides of the viewing screen within the housing. A reversible motor drive is operatively associated with the rollers to shift the same in one or another direction so as to move the scroll in translatory fashion across the viewing screen.

In turn, the scroll drives a carriage carrying sensor switches responsive to the fingers or levers activated by insertion of the film, the switches functioning to energize the motor in a forward or reverse direction in accordance with the sensed dimension of the film.

It is accordingly an object of the invention to provide an X-ray viewing device which automatically obscures or masks those portions of a viewing screen which are out of registry with an X-ray or like film mounted on the screen.

A further object of the invention is the provision of a device of the type described and including a dimension sensing mechanism responsive to insertion of a film which functions to shift a scroll carrying obscuring portions into edge masking relation of a film automatically responsive to a dimensional characteristic of the film.

A further object of the invention is the provision of a device of the type described and including mechanism and circuitry for assuring that the film lighting apparatus is energized only after appropriate masking has been effected.

Still a further object of the invention is the provision of a device of the type described wherein the scroll bears masking components corresponding to each of a number of stock X-ray film sizes, the scroll being shifted to align an appropriate mask with the borders of a complementally sized film automatically, responsive to a sensed dimension of the film.

To attain these objects and such further objects as may appear herein or be hereinafter pointed out, reference is made to the accompanying drawings, forming a part hereof, in which:

FIG. 1 is an exploded frontal perspective view of viewing device in accordance with the invention;

FIG. 2 is a plan view of a masking scroll for use in connection with the device, the scroll being displayed in a spread or stretched-out condition;

FIG. 3 is a plan view of the inside of the front face of the housing;

FIG. 4 is a plan view of the inside of the rear face of the housing;

FIG. 5 is a magnified horizontal section taken on the line 5—5 of FIG. 3;

Figure 7:
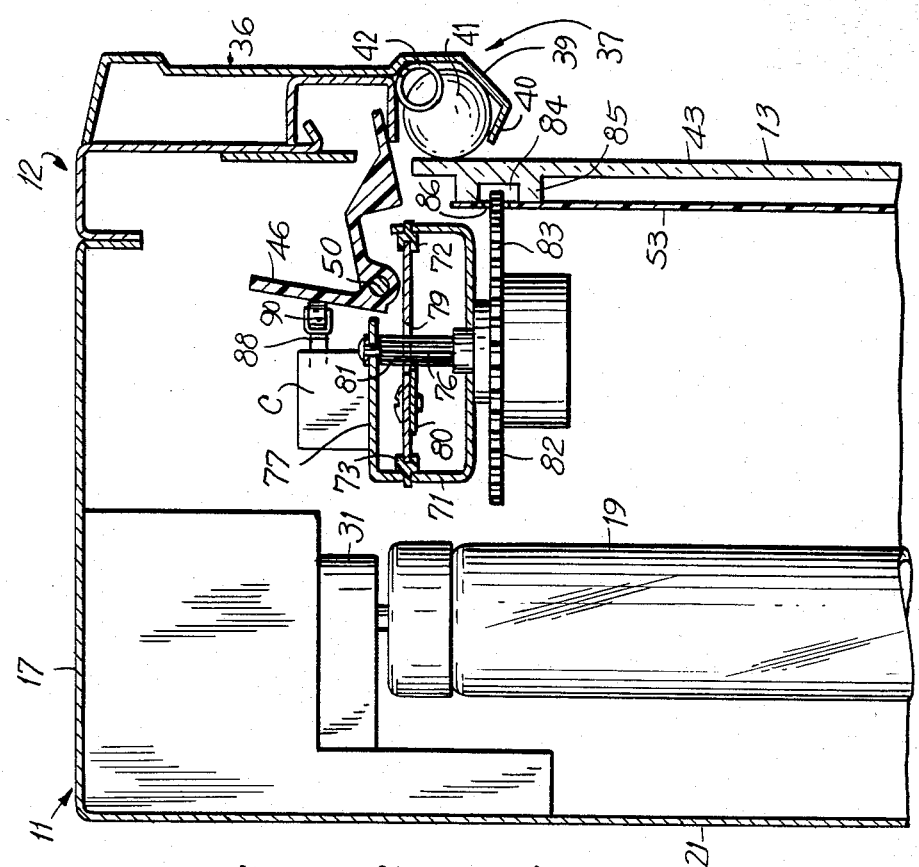
FIG. 7 is a sectional view similar to FIG. 6 showing the position of the parts beyond the side edge of a film.

Referring now to the drawings, there is shown in FIG. 1 a viewing device 10 in accordance with the invention, the device including a rear housing 11 and a front housing 12. The front housing 12 includes a diffuser plate 13 against which an X-ray 14 or the like may be mounted for viewing.

The rear housing 11, as best seen in FIG. 4, includes side walls 15, 16 and top and bottom walls 17 and 18, respectively. A series of fluorescent lamps 19 is mounted between the top and bottom walls 17, 18. Ballast for the fluorescent bulbs 19 is secured to back wall 21 of the rear housing.

Affixed to the rear housing is a drive motor 22 of the reversible type. Drive shaft 23, which is connected to the rotor of the motor through a suitable speed reducing gear (not shown) carries drive pulley 24 which, through belt 25, is coupled to output pulley 26 journalled for rotation about a vertical axis on a bearing mounted to bracket 27 secured to the rear housing.

Figure 12:
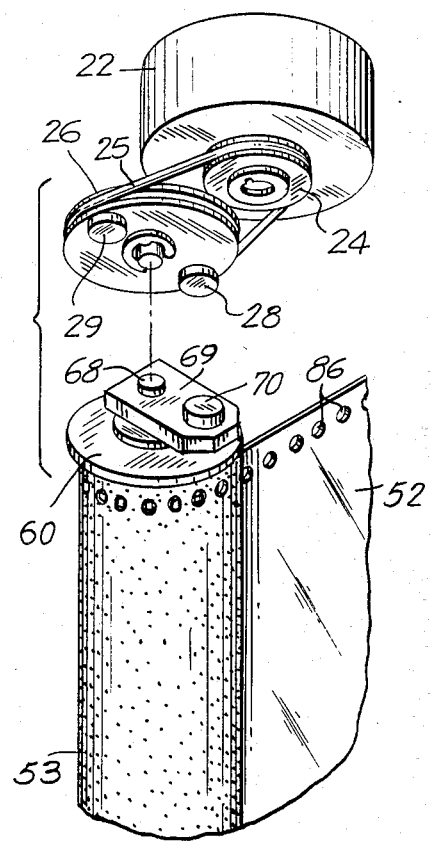
FIG. 12 is an exploded perspective view of the motor drive assembly of the device.

As best seen in FIG. 12, the output pulley 26 includes a diametrically opposed pair of drive studs 28, 29.

The rear housing 11 carries a female socket assembly 30 coupled to the mains lines which, as will be explained hereinafter, provides electrical connection to the switching mechanisms carried on the front housing assembly 12.

Fluorescent tubes 19 are mounted between conventional socket members 31 secured adjacent the upper and lower ends of the housing 11.

The front housing assembly 12 comprises a frame 32 including side margins 33, 34 and bottom margin 35 and upper margin 36. The upper margin 36 includes a film holding mechanism 37, the operation of which is best understood from an inspection of FIGS. 6 and 7.

The holding mechanism includes a horizontally arrayed track 38 having a cam surface 39 inclined downwardly and inwardly toward the diffuser plate 13. The track 38 terminates in an upwardly directed lip 40, the innermost edge of which is spaced from the diffuser plate. A series of side-by-side disposed spherical members 41 is encompassed within the track 38.

An elongate helical spring 42 is horizontally arrayed within the track 38, the spherical members 41 being disposed between convolutions of the spring 42. Pressure of the spring 42 against the members 41, augmented by the force of gravity and by the cam surface 39, yieldably urges the members 41 against the outer face 43 of the diffuser plate 13, as shown in FIG. 7.

Figure 6:
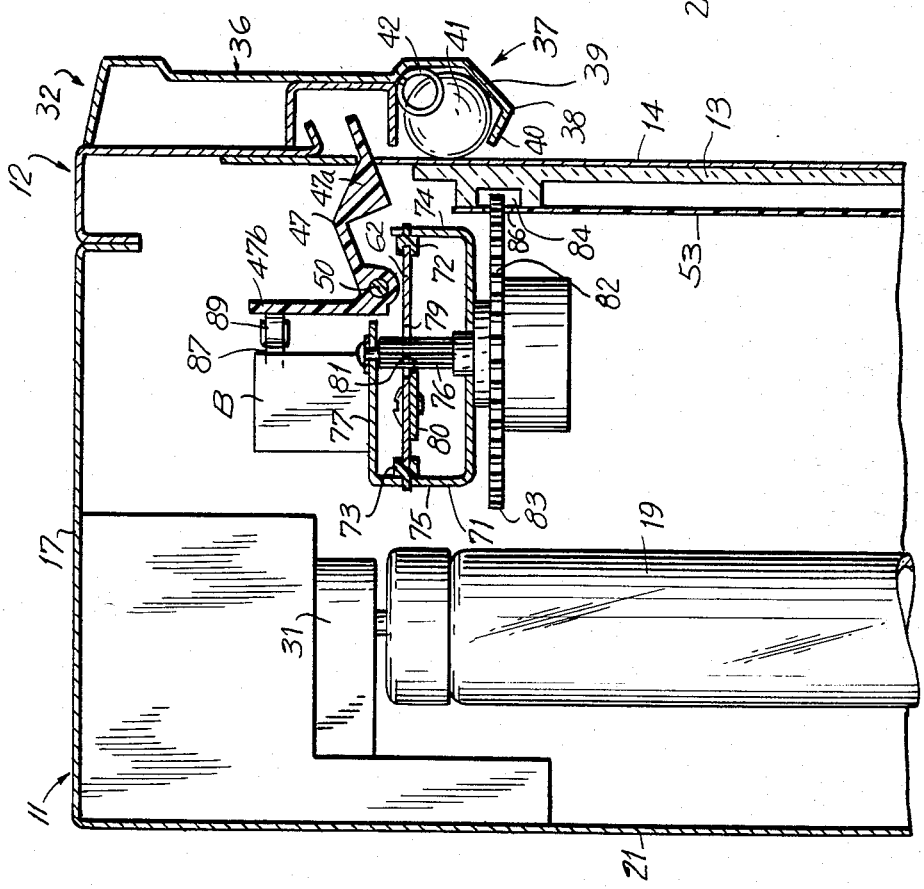
FIG. 6 is a fragmentary vertical section taken on the line 6—6 of FIG. 5 with an X-ray film in place.
Figure 8:
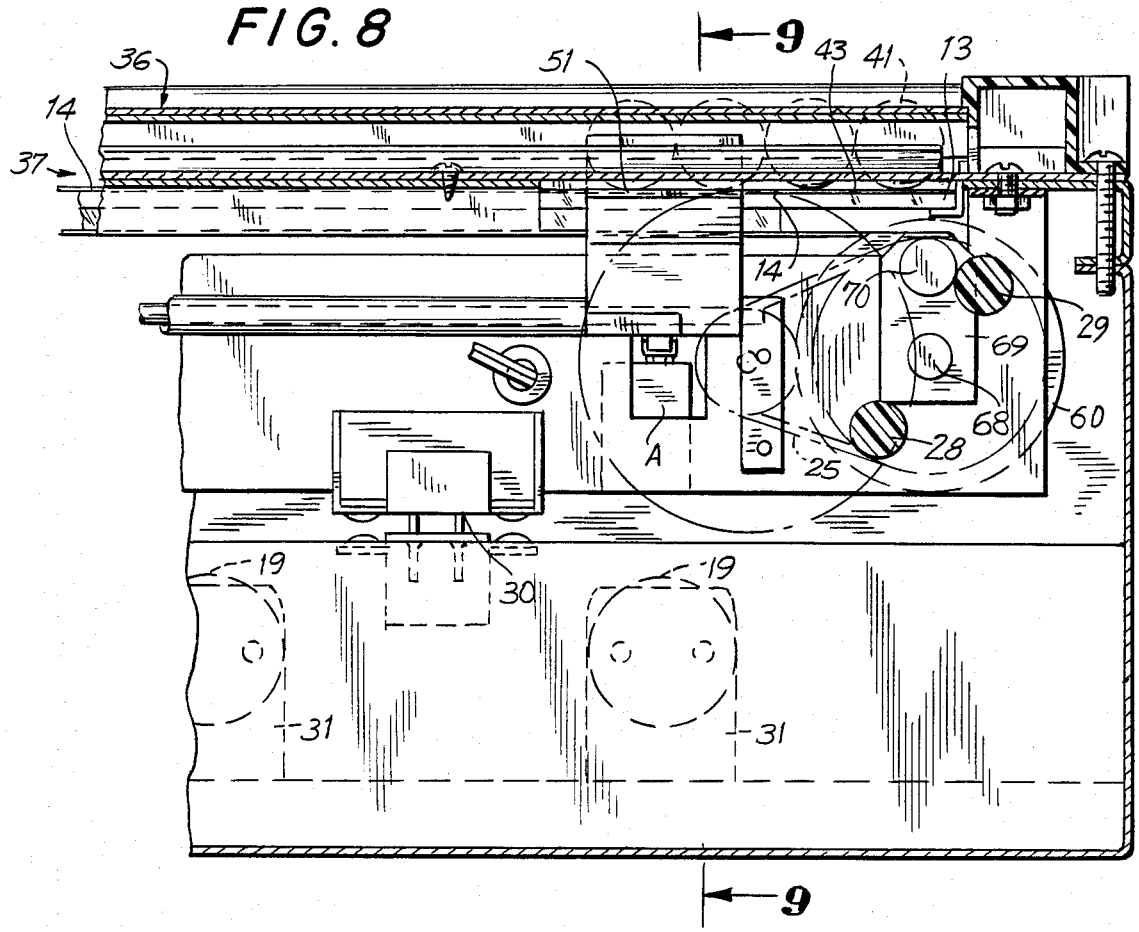
FIG. 8 is a horizontal section in magnfied scale taken on the line 8—8 of FIG. 3.

In FIG. 8, X-ray film 14 is shown as having been inserted into the space between the track 38 and diffuser plate 13, it being appreciated from an inspection of FIG. 6 that the spherical members will yieldably urge the film against the face of the diffuser plate, retaining the film in a desired inserted position.

A series of actuator or width sensing members 44, 45, 46, 47, 48, and 49 in the form of L-shaped levers is mounted on a horizontal pivot bar 50 extending transversely of the front housing 12 inwardly of the track 38. The levers 44 through 49 each include a film engaging arm and switch trip arm, the said arms bearing the reference numerals of the respective levers with the addition of the letters "a" and "b", respectively.

As is evident from FIGS. 6 and 7, the insertion of a film 14 into the above described holder mechanism functions to shift those of the levers 44 through 49 into registry with the film in an anti-clockwise direction about the pivot bar 50. It will be further appreciated that the number of levers which are shifted upon insertion of the film is a function of the width of the X-ray film, the device being utilized by employing the lefthandmost wall 34 of the front housing 12 as a reference surface.

In other words, the widest X-ray film may result in a tripping or anti-clockwise movement of all of the levers 44 through 49. Insertion of an X-ray film of the smallest widthwise dimension of the selected group of stock sizes may trip only lever 49. Obviously intermediate sizes of films will trip more or fewer of the levers in accordance with the widthwise dimension of the film.

Figure 9:
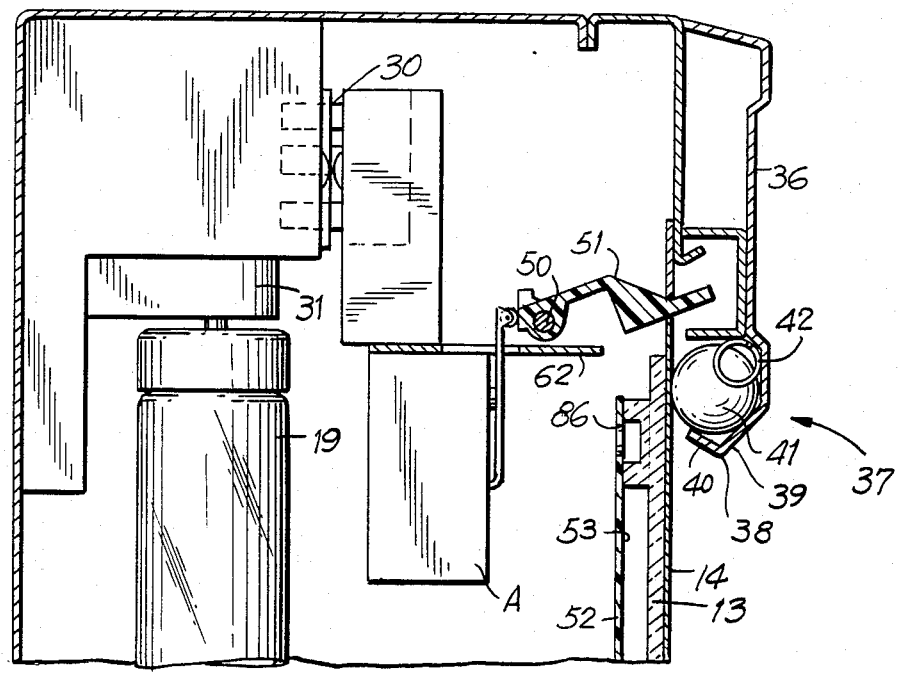
FIG. 9 is a vertical section taken on the line 9—9 of FIG. 8.

The front housing carries, in addition, on bar 50 behind track 38 in a position adjacent the lefthandmost margin 34, an on-off lever 51 (FIG. 9) which, by virtue of its positioning, will be engaged by X-ray films of even the smallest dimension to be employed.

Masking of the inner surface of the diffuser plate 13 is effected by a flexible scroll member 52, shown in FIG. 2 in its unrolled condition. The scroll 52 includes an opaque area 53, illustrated by stippling in the drawings, and a series of light passing translucent or transparent areas 54, 55, 56, 57, 58, 59, displaced longitudinally therealong. The areas 54 through 59 are arranged in progressively increasing widthwise dimension, and correspond to stock sizes of X-ray films.

The scroll member 52 is convoluted about a verticlly directed pair of rollers 60, 61 located within the front housing 12 adjacent the lefthand and righthand margins 34, 33, respectively. The rollers 60, 61 have their upper ends journalled within bearings supported on a transversely extending bracket 62. The lower ends of the rollers 60, 61 are journalled in spaced parallel bearing apertures formed in lower mounting plate 63.

Optionally but preferably, the roller 61, which may be referred to as a "take-up roller", includes an internal spring mechanism 64 which maintains a constant tension in the scroll much in the manner of the spring of a conventional window shade.

The rollers 60, 61 include sprocket members 65, 66, respectively, at their lower ends, the sprockets being coupled by a drive belt 67 whereby the rollers are connected for conjoint rotation.

For purposes of simplicity, the roller 61 may be referred to as the idler roller and the roller 60 as the driver roller.

The roller 60 includes a drive shaft 68 (FIG. 12) which projects upwardly beyond the transverse mounting bracket 62, the shaft 68 carrying an eccentric arm 69 on which is mounted an eccentric drive button 70.

As best appreciated from an inspection of FIG. 12, when the front and rear housings are coupled as shown in FIG. 1, the shaft 68 will lie essentially concentric with the axis of rotation of the pulley 26 and the drive button 70 will lie in an arc which registers with the drive studs 28, 29. It will thus be seen that when the pulley 26 is rotated in either direction, one or the other of the drive studs 28, 29 will be in driving connection with the drive button 70 and will rotate the roller 60 in one direction or the other in accordance with the direction of rotation of the pulley 26.

Mounted on the transverse bracket 62 in registry with lever 51, which may be referred to hereinafter as an on-off control lever, is on-off switch A. Bracket 62 likewise supports a male power take-off receptacle 30' which, in the connected position of the front and rear housings, mates with receptacle 30 of the rear housing.

There will next be described the width sensing mechanism which functions to energize the drive motor 22 to shift the position of the scroll 52 to align an appropriate light-passing area of the scroll (54 through 59) with the upper lefthandmost portion of the diffuser plate automatically responsive to the width of an X-ray film inserted into the holder 36.

The sensing mechanism comprises a carriage 71 which is mounted for translatory movement in a horizontal direction transversely of the upper bracket 62.

The carriage 71, as best appreciated from FIGS. 6 and 7, includes opposed, horizontally spaced-apart, generally U-shaped polymeric glide portions 72, 73 mounted on upstanding arms 74, 75, respectively, the glide portions slidably embracing forwardmost and rearwardmost surfaces of the upper bracket 62 so as to enable smooth horizontal travel of the carriage 71.

A vertically directed pinion gear 76 is mounted for rotation about a vertical axis between the upper and lower walls 77, 78, respectively, of the carriage 71. The pinion gear 76 extends through a transversely directed horizontal slot 79 formed in the bracket 62.

Figure 10:
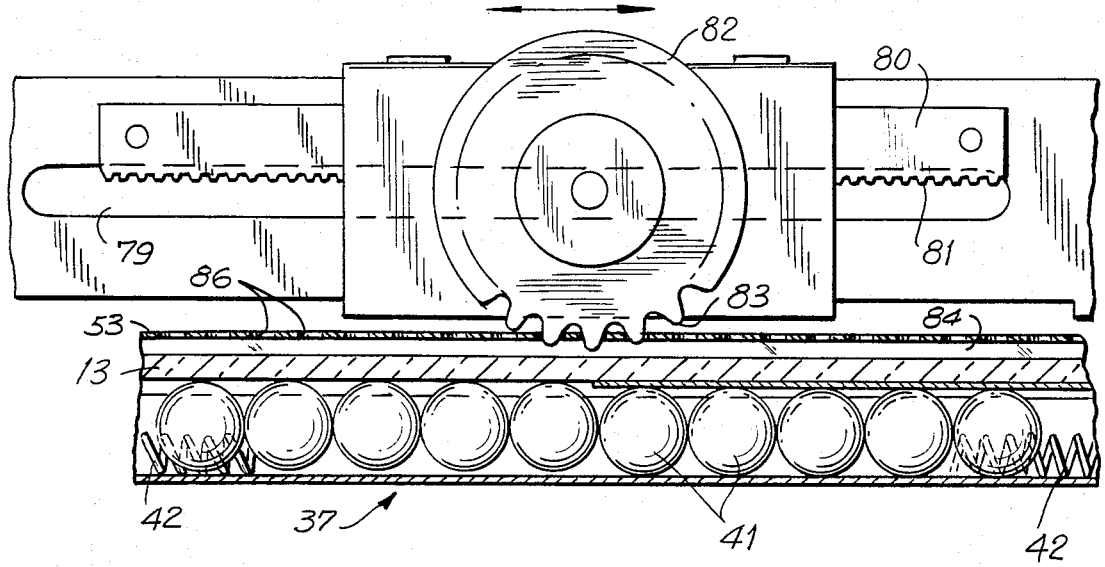
FIG. 10 is a horizontal section in magnified scale taken on the line 10—10 of FIG. 3.
Figure 11:
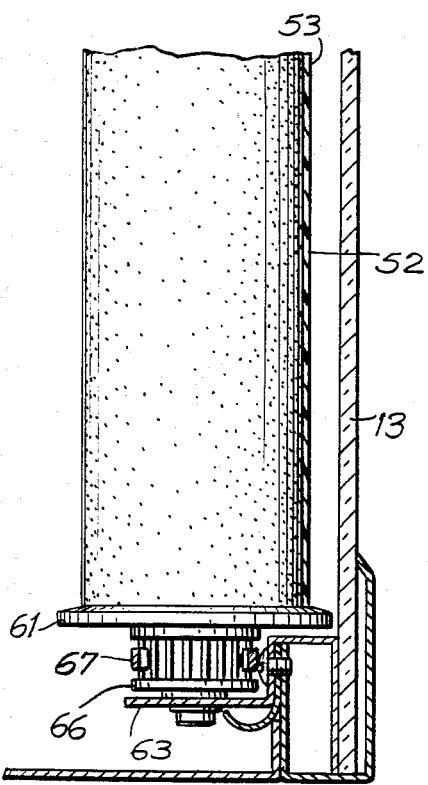
FIG. 11 is a vertical section taken on the line 11—11 of FIG. 3.

The pinion gear 76 is meshed with a toothed rack segment 80 affixed to the bracket 62, the teeth 81 of the rack projecting into and defining an edge portion of the slot 79 (see FIG. 10).

Keyed to the pinion gear 76 is a sprocket 82. The teeth 83 of the sprocket project into a horizontally directed recess 84 formed in the guideway section 85 fixed to the rear face of the diffuser plate 13. The teeth 83 of the sprocket 82 extend through drive apzrtures 86 formed in the scroll adjacent the upper margin thereof.

From the foregoing description it will be appreciated that when the rollers 60, 61 rotate, causing the scroll to scan across the interior surface of the diffuser plate 13, rotary movement will be imparted to the sprocket 82 by virtue of the meshed connection between the sprocket and drive apertures 86 of the scroll. Rotation of the sprocket will cause a concomitant rotation of the pinion 76 which, by virtue of its meshed connection with rack 80, will cause the carriage 71 to move transversely in the same direction as the direction of movement of the scroll.

While the movements of the carriage are of substantially smaller magnitude than the movements of the scroll, such movements nonetheless are in direct proportion to the amount of movement of the scroll.

Mounted on carriage 71 are sensing switches B and C. Switches B and C, which are of the single pole, double throw type, include control arms 87, 88, respectively, which are normally spring projected from the bodies of the switches. The arms 87, 88 include trip rollers 89, 90, respectively, at their distal ends.

As best appreciated from an inspection of FIGS. 6 and 7, the trip rollers 89, 90 are spring pressed forwardly by the internal mechanism of the switches. The rollers are thus normally spaced from the respective switches (FIG. 7) except when the same are disposed in registry with one of the levers 44 through 49 which has been shifted anticlockwisely, as by the insertion of an X-ray film (FIG. 6).

Figure 13:
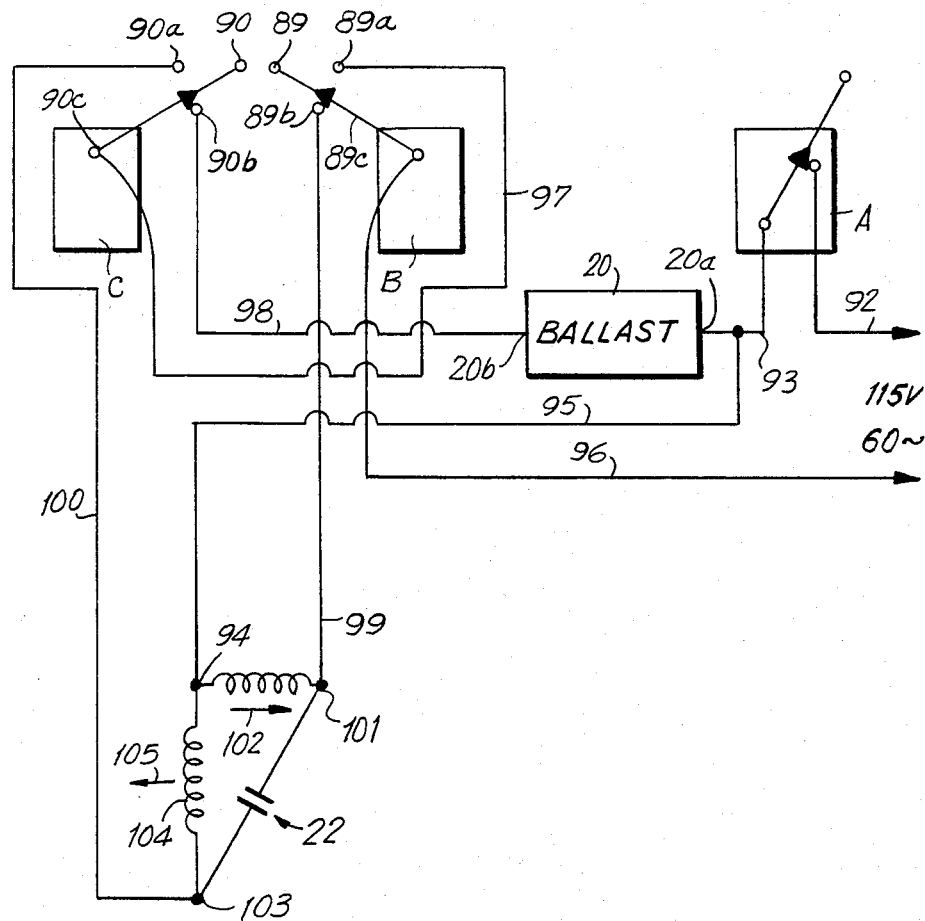
FIG. 13 is a diagram of the control circuit of the assembly.

The operation of the sensing mechanism is best appreciated by reference to the circuit diagram of FIG. 13. In such figure the condition of the switches A, B and C is illustrated in the quiescent condition, i.e. where no film is inserted in the holder mechanism.

Three possible conditions of activation may result from the insertion of an X-ray film. More specifically, the inserted film may be larger than the last inserted film, smaller than the last inserted film, or the same size as the last inserted film.

The functioning of the sensing mechanism will be described with reference to the diagram for each of the three noted conditions of operation.

Insertion of film of the same size as that last used in the device

When a film is inserted, the switch A is closed as a result of lifting lever 51 connecting mains lead 92 to conductor 93. By this action the mains lead 92 is connected to the common connection 94 of motor 22 via line 95 and also to one terminal 20a of the ballast.

Since the film inserted is assumed to be of the same size as that with which the machine had last been used, the film will be of a dimension which will shift the position of switch B but not switch C. When switch B is shifted in position, the common contact 89c will couple line 96 of the mains connected to the common contact 89c of switch B with contact 89a. In the shifted condition of the common contact 89c, current will flow through line 96, conductor 97, leading to the common contact 90c of switch C which, as illustrated, normally engages contact 90b of switch C. Current may now flow through conduit 98 to the other terminal 20b of the ballast 20, thereby igniting the fluorescent lights.

It will be seen that no current will flow to the motor 22 since the common contact 89c of switch B is clear of contact 89b connected by conduit 99 to one non-common terminal of the motor 22. Similarly, since the common contact 90c of switch C is decoupled from contact 90a of such switch, no current may pass through line 100 leading to the opposite non-common terminal of the motor 22.

Insertion of film of smaller size than that last used in the device

When a smaller film is inserted, switch A is triggered so as to couple mains lead 92 to line 93, as previously described. However, both switches B and C will remain in the same sense or position as illustrated in FIG. 13. Under these circumstances, current from mains lead 96 flows to the common contact 89c of switch B through normally closed contact 89b through conductor 99 to terminal 101 of the reversible motor 22.

Since the common contact 94 of the motor is connected to mains lead 96, the motor will be driven in the direction of the arrow 102, driving the scroll across the diffuser, and by virtue of the connection between scroll and sprocket 82, causing carriage 71 to shift toward switch A until progressively smaller light passing areas are scanned across the diffuser plate.

Movement of the carriage will continue until the sense of switch B changes as a result of the trigger roller 89 of the switch B engaging against a lifted lever portion, e. g. 47b, being the righthandmost lever (when viewed from the front) lifted by the inserted film. Upon changing of the sense of switch B, current flow through line 99 is interrupted, stopping the motor. Since common contact 89c of switch B is now in conductive relation with contact 89a, current is permitted to flow to terminal 20b of the ballast from mains lead 96, igniting the fluorescent tubes. The current path to the ballast is from line 96, through contact 89c to 89a, through conduit 97, to contact 90c of switch C, through contact 90c to contact 90b, through conduit 98 and thence to the ballast.

Insertion of film of larger size than that last used in the device

When a film of larger size than that last used in the device is inserted, it will be observed that all three of switches A, B and C are tripped, i.e. the position of all three switches is changed from the condition shown in FIG. 13 since the larger film will raise more of the levers 44 through 49 than the prior smaller film. Under such circumstances, current from mains lead 96 flows through switch B to contact 89a, through conduit 97 to the common contact 90c of switch C, to contact 90a of switch C, through line 100, to the terminal 103 of the motor 22.

In this condition the coil 104 of the motor is energized, causing the motor to drive the scroll and, hence, the carriage 71 in the direction of arrow 105. Movement will continue until switch C returns to the position illustrated in FIG. 13 as a result of the trigger roller of switch C clearing the righthandmost lever lifted by the film. The return movement of switch C results in an opening of the circuit through contact 90a and conduit 100, shutting off power to the motor 22.

When the common contact of switch C is coupled to contact 90b of switch C, current now flows to the terminal 20b of ballast 20 through a circuit path extending from conduit 96, through switch B to contact 89a, through conduit 97, through switch C to contact 90b, and through conduit 98 to the terminal 20b.

From the foregoing it will be apparent that in the operative or viewing position, in each instance switches A and B are in a changed sense or position from that illustrated in FIG. 13 and switch C is in the same sense as illustrated in FIG. 13. In other words, whenever a film is inserted of a different size from that which wast last used in the device, the motor will be energized in a direction which will result in switch B being shifted from the illustrated position of FIG. 13 and switch C remaining or returning to the position illustrated in FIG. 13.

In all instances the circuit through the fluorescent tubes is energized only after the motor has stopped and the scroll has thus reached a position which corresponds to the size of the X ray film to be viewed.

It will further be appreciated that the spacing of the transparent or translucent components of the scroll is initially coordinated with the movements of the carriage 71 in such manner as to achieve the desired result.

As is apparent from the description and views, the trigger roller of the switch C is located slightly further from the lefthandmost or indexing edge of the viewer than the trigger roller of the switch B. It is thus assured that the switch components will ultimately always occupy the desired position (i.e. switch B shifted from the reference position of FIG. 13; switch C in position illustrated in FIG. 13) responsive to the lifting of one or more of the respective levers 44 through 49.

The width of the levers is, of course, coordinated with the width of stock sizes of X-ray films and it will thus be seen that the width sensing mechanism automatically coordinates the adjusted position of the scroll in accordance with the width of an inserted X-ray film.

From the foregoing it will be apparent that there is described an X-ray or like film viewing apparatus which is energized responsive to insertion of a film at a particular index location adjacent the upper lefthandmost margins of the device, the apparatus functioning automatically to occlude or obscure from transmission of light all portions of the viewing screen below and to the right of the film.

Since X-ray films come in stock sizes and since the scroll is coordinated with such sizes, occlusion of the lengthwise dimension of a film to be viewed is an automatic result of the sensing of the widthwise dimension since no two films of the same widthwise dimension differ in lengthwise dimension.

Numerous variations in details of construction will occur to those skilled in the art and familiarized with the instant disclosure. Accordingly, the invention is to be broadly construed within the scope of the appended claims.

Having thus described the invention and illustrated its use, what is claimed as new and is desired to be secured by Letters Patent is:

1. In a viewing device for X-ray films or the like including a housing, a light source in said housing, a diffuser plate mounted on said housing and holder means for supporting a film to be viewed against said diffuser plate, the improvement comprising a masking assembly for blocking light from said source from passing through said plate except in the areas of said film, said assembly including an elongate scroll member interposed between said light source and said diffuser plate, said scroll member including a plurality of linearly spaced apart light transmitting areas sized to correspond to the standard dimensions of films to be viewed, the spaces between said light transmitting areas being opaque, motor means operatively connected to said scroll member for shifting said scroll member linearly thereof in either direction, sensor means positioned in the path of an edge portion of a film disposed in predetermined position in said holder means for sensing the dimension of said edge portion, and control means triggered by said sensor means and operatively connected to said motor means for causing said motor to drive said scroll member linearly to align a light transmitting area of said scroll of dimension corresponding to the sensed dimension of said film into registry with said predetermined position.

2. A device in accordance with claim 1 and including switch means in said holder means for energizing said light source and said motor means.

3. A device in accordance with claim 1 wherein said sensor means comprise a plurality of side-by-side lever members, said lever members being normally biased to a first position intersecting said path and being deflected to a second position clear of said path responsive to insertion of a said film.

4. Apparatus in accordance with claim 3 wherein said control means comprises switch means for operating said motor in a forward or reverse direction selectively responsive to the position of said lever members.

5. Apparatus in accordance with claim 4 and including a pair of roller members rotatably mounted in said housing about spaced parallel axes, said scroll member including portions convoluted about each of said roller members and a central portion extending between said roller members.

6. Apparatus in accordance with claim 5 wherein said scroll member includes drive apertures and said control means includes a sprocket meshed with said drive apertures, the combination including means for shifting said control means relative to said lever members responsive to rotation of said sprocket by movements of said scroll member.

7. Apparatus in accordance with claim 6 wherein said means for shifting said control means relative to said lever members comprises a rack fixed to said housing, a shaft connected to said sprocket, and a gear member connected to said shaft and meshed with said rack.

8. In a viewing device for an X-ray film and the like including a housing, a light source in said housing, a diffuser plate mounted on said housing, holder means for supporting film to be viewed over said plate, the improvement which comprises sensing means responsive to a dimension of a said film mounted on said plate, movable mask means interposed between said light source and said film, and motor means operatively connected to said mask means for shifting the position of said mask means in accordance with the dimension of said film as sensed by said sensing means, thereby to mask the portions of said plate displaced from said film.

9. Apparatus in accordance with claim 8 and where said mask means comprises a scroll, said scroll including a plurality of longitudinally spaced panels sized to correspond to the dimensions of said diffuser plate, each said panel including a light transmitting area sized to correspond to the dimensions of a standard sized film, the remainder of said panels being opaque.

10. Apparatus in accordance with claim 9 wherein said motor means is reversible and said sensing means is adapted to energize said motor means in a forward or a reverse direction selectively in accordance with a sensed dimension of said film.

11. An automatic masking device for X-ray films or the like comprising a housing, a light source in said housing, a light transmitting plate on said housing, an elongate scroll member movably mounted in said housing, said scroll member including opaque portions and a plurality of longitudinally spaced-apart light transmitting portions in sizes corresponding substantially to the size of stock films, motor means adapted to move said scroll for aligning a selected one of said transmitting portions with said plate, with said opaque portions of said scroll obscuring the remainder of said plate, film holder means disposed adjacent said plate for supporting a film over said plate, a plurality of lever members positioned to engage an edge portion of a film in said holder means, and switch means operatively associated with said lever members and said motor for energizing said motor to align a predetermined said light transmitting area with said plate selectively responsive to the location of the lever members engaged by said film.

12. Apparatus in accordance with claim 11 and including a carriage movably mounted within said housing, drive means operatively connected between said scroll and said carriage for shifting said carriage responsive to movement of said scroll, said switch means being disposed on said carriage and movable in a path intersecting said lever members.

13. Apparatus in accordance with claim 12 wherein said switch means comprises first and second switch members displaced one from the other in the direction of movement of said carriage.

14. Apparatus in accordance with claim 13 and including a control switch member positioned to be tripped responsive to insertion of a film into said holder means, the combination including circuit means for energizing said light source responsive to the positioning of a selected said light transmitting area adjacent said plate.

* * * * *